US011588881B2

(12) United States Patent
Hinnant et al.

(10) Patent No.: US 11,588,881 B2
(45) Date of Patent: *Feb. 21, 2023

(54) WEB BROWSER MULTI-MEDIA REDIRECTION

(71) Applicant: Microsoft Technology Licensing, LLC, Redmond, WA (US)

(72) Inventors: Neil Rust Hinnant, Seattle, WA (US); Sandeep Patnaik, Kirkland, WA (US); Isuru Chamara Pathirana, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/302,571

(22) Filed: May 6, 2021

(65) Prior Publication Data

US 2021/0258369 A1 Aug. 19, 2021

Related U.S. Application Data

(63) Continuation of application No. 16/733,183, filed on Jan. 2, 2020, now Pat. No. 11,012,498.

(51) Int. Cl.
*H04L 67/08* (2022.01)
*G06F 9/455* (2018.01)
(Continued)

(52) U.S. Cl.
CPC .......... *H04L 67/08* (2013.01); *G06F 9/45558* (2013.01); *H04L 65/70* (2022.05);
(Continued)

(58) Field of Classification Search
CPC ....... H04L 67/08; H04L 67/563; H04L 65/70; H04L 67/565; H04L 65/75; H04L 67/568;
(Continued)

(56) References Cited

U.S. PATENT DOCUMENTS 8,170,123 B1 * 5/2012 Hobgood ................ H04L 67/08
375/240.26
10,147,115 B1 * 12/2018 Bidarkar ............ G06Q 30/0246
(Continued)

OTHER PUBLICATIONS

"Non Final Office Action Issued in U.S. Appl. No. 17/302,570", dated Apr. 14, 2022, 33 Pages.
(Continued)

*Primary Examiner* — Jerry B Dennison
(74) *Attorney, Agent, or Firm* — Jacob P. Rohwer; Newport IP, LLC (57) ABSTRACT

A computer system is provided that includes at least one processor configured to execute a host virtual machine configured to host a session with at least one client computer device. The at least one processor is further configured to execute a web browser application configured to access media content from a remote media source, receive encoded media content from the remote media source in a media container format, and execute a multi-media redirection module configured to intercept the encoded media content from being processed by a decoding module of the web browser application. The multi-media redirection module is configured to redirect the encoded media content to the at least one client computer device.

20 Claims, 7 Drawing Sheets

(51) Int. Cl.
*H04L 67/02* (2022.01)
*H04L 65/70* (2022.01)
*H04L 65/75* (2022.01)
*H04L 67/563* (2022.01)
*H04L 67/565* (2022.01)
*H04L 67/568* (2022.01)
*H04L 67/01* (2022.01)

(52) U.S. Cl.
CPC .............. *H04L 65/75* (2022.05); *H04L 67/02* (2013.01); *H04L 67/563* (2022.05); *H04L 67/565* (2022.05); *H04L 67/568* (2022.05); *G06F 2009/45595* (2013.01); *H04L 67/01* (2022.05)

(58) Field of Classification Search
CPC ..... H04L 67/02; H04L 67/01; G06F 9/45558; G06F 2009/45595
See application file for complete search history.

(56) References Cited

U.S. PATENT DOCUMENTS

| | | | |
|---|---|---|---|
| 10,742,706 B1* | 8/2020 | Zhu | H04L 67/02 |
| 11,012,485 B1* | 5/2021 | Hinnant | H04L 65/605 |
| 11,012,498 B1* | 5/2021 | Hinnant | H04N 21/8543 |
| 2010/0106798 A1* | 4/2010 | Barreto | G06F 16/957 709/227 |
| 2014/0344332 A1* | 11/2014 | Giebler | H04L 65/60 709/203 |
| 2015/0264149 A1* | 9/2015 | Guo | H04N 21/25866 709/203 |
| 2016/0080780 A1* | 3/2016 | Öman | H04L 47/722 725/10 |
| 2017/0104797 A1* | 4/2017 | Venkatesh | H04L 65/605 |
| 2017/0142184 A1* | 5/2017 | Fausak | G06F 21/10 |
| 2018/0007400 A1* | 1/2018 | Chen | H04N 19/42 |
| 2018/0213301 A1* | 7/2018 | Cheung | H04N 21/4341 |
| 2019/0207996 A1* | 7/2019 | Sehgal | H04N 21/2662 |
| 2020/0068171 A1* | 2/2020 | Fadili | H04N 7/152 |
| 2020/0204858 A1* | 6/2020 | Olson | H04N 21/2747 |
| 2020/0252473 A1* | 8/2020 | Kumar | G06F 16/955 |
| 2021/0258362 A1* | 8/2021 | Hinnant | H04L 65/75 |

OTHER PUBLICATIONS

"Notice of Allowance Issued in U.S. Appl. No. 17/302,570", dated Oct. 19, 2022, 10 Pages.

* cited by examiner

WEB BROWSER MULTI-MEDIA REDIRECTION

CROSS REFERENCE TO RELATED APPLICATIONS

This application is a continuation of U.S. patent application Ser. No. 16/733,183, filed Jan. 2, 2020, the entirety of which is hereby incorporated herein by reference for all purposes.

BACKGROUND

In virtual environments, end users may use client devices to connect to a virtual machine running on server hardware, which may provide the end user with the benefits of added compute power, application compatibility, security and regulatory compliance, and a reduction in overall cost for the end user. Typically, these end users may consume media such as video streaming, which can potentially increase the workload placed on the server hardware and increase associated costs.

SUMMARY

A computer system is provided that may include at least one processor configured to execute a host virtual machine configured to host a session with at least one client computer device. The at least one processor may be further configured to execute a web browser application configured to access media content from a remote media source, receive encoded media content from the remote media source in a media container format, and execute a multi-media redirection module configured to intercept the encoded media content from being processed by a decoding module of the web browser application. The multi-media redirection module may be configured to redirect the encoded media content to the at least one client computer device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Cloud platform services may provide virtualized desktop environments for end users that may utilize a client computer device to connect to a virtual machine running on a server device of the cloud platform. Typically, the computer hardware and network capabilities of the cloud platform are more powerful than the client computer devices of the end users. Thus, by hosting these end users on the virtualized desktop environment, the cloud platform may provide those users with added compute power, as well as other potential benefits such as improved application compatibility, security/regulatory compliance, and an overall reduction of associated compute costs.

In some examples, these cloud platform services may provide virtual desktop infrastructure for enterprises that have multiple end users and client devices. The users of these enterprises may consume media, such as, for example, video and/or audio media that is stored locally on the cloud platform for that enterprise or stored by remote media sources and streamed to the virtualized desktop environment run on the cloud platform. Typically, the media content being provided by a media source is decoded on a virtual machine that is hosting an end user, and then display frames for the virtualized desktop that is presenting that media content are re-encoded and streamed to the client computer device of the user over a remote desktop protocol. The client computer device may then decode those display frames and present them to the user via a display of the client computer device.

The decoding and subsequent encoding process performed on the virtual machine may consume a large amount of compute resources of the server hardware. In one particular example, video rendering processes for video streaming may potentially consume 20%-40% of central processing unit (CPU) resources of the server device running the virtual machine. These issues may be further exacerbated in multi-session virtualized desktop environment deployments where multiple users share an operating system (OS) instance on a VM. For example, if more than one user attempts to stream video content through the shared host VM, all of the CPU resources for that VM may potentially be consumed by the associated decoding/encoding/rendering processes, thus potentially degrading the user experience of all of the users being hosted by that VM.

Figure 1:
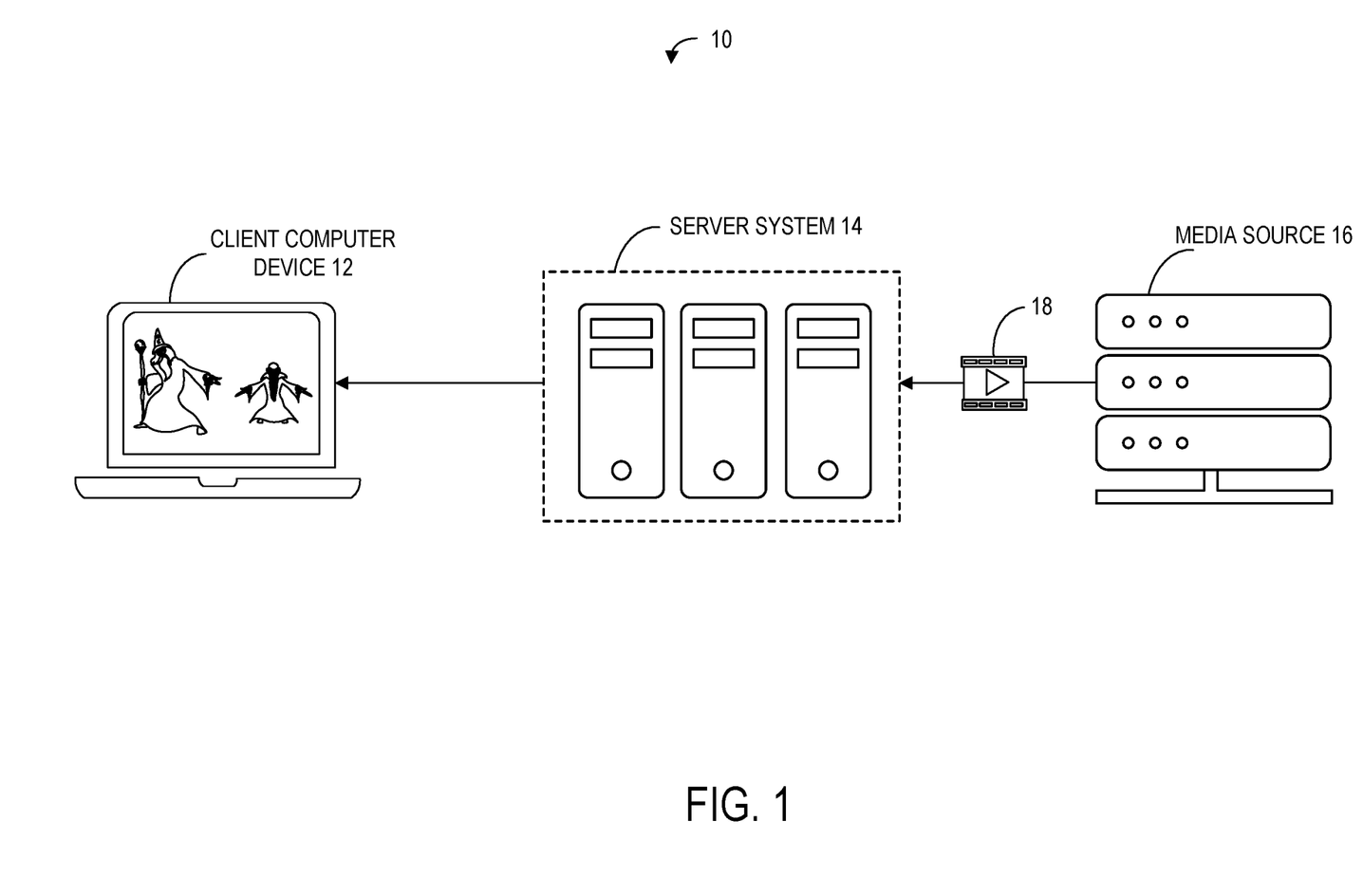
FIG. 1 is a schematic view of an example computer system for performing multi-media redirection of the present description.

To address the issues discussed above, FIG. 1 illustrates an example computer system 10 for a virtualized desktop environment that performs multi-media redirection to reduce the compute workload on the server hardware running the virtualized desktop environment, as will be discussed in more detail below. As illustrated in FIG. 1, the computer system 10 includes one or more client computer devices 12, a server system 14, and one or more media sources 16. End users of the one or more client computer devices 12 may connect to virtual machines run on the server system 14. Using applications executed within the host operating system of the VM, such as, for example, a web browser application, the end user may interact with media stored by the media source 16.

In one example, the media source 16 may be local to the server system 14, and may be included in the server system 14. In another example, the media source 16 may be remote to both the client computer devices 12 and the server system 14. For example, the server system 14 may be configured to communicate with a remote media source over a communication network such as a Wide Area Network (WAN). As a specific example, an end user may enter input to a web browser application executed within the host VM to navigate to a website associated with the media source 16, such as, for example, a video streaming website. Using the associated website, the end user may initiate an experience that includes streaming video and/or audio. Typically, the streaming video and/or audio is sent to the server system 14 as encoded media 18, and processed by the host VM executing the web browser application that requested the steaming video and/or audio.

As discussed above, typical virtualized environment implementations will decode the encoded media 18, present the media content via the virtualized desktop environment, encode display/audio frames for the virtualized desktop environment, and then send the encoded display/audio frames to the client computer device 12 for presentation to the end user. To reduce the computational burden placed on the hardware of the server system 14 caused by the decode/encode processes, the server system 14 may implement multi-media redirection to pass the encoded media 18 received from the media source 16 to the client computer device 12 without performing encoding or decoding processes on the server system 14.

Figure 2:
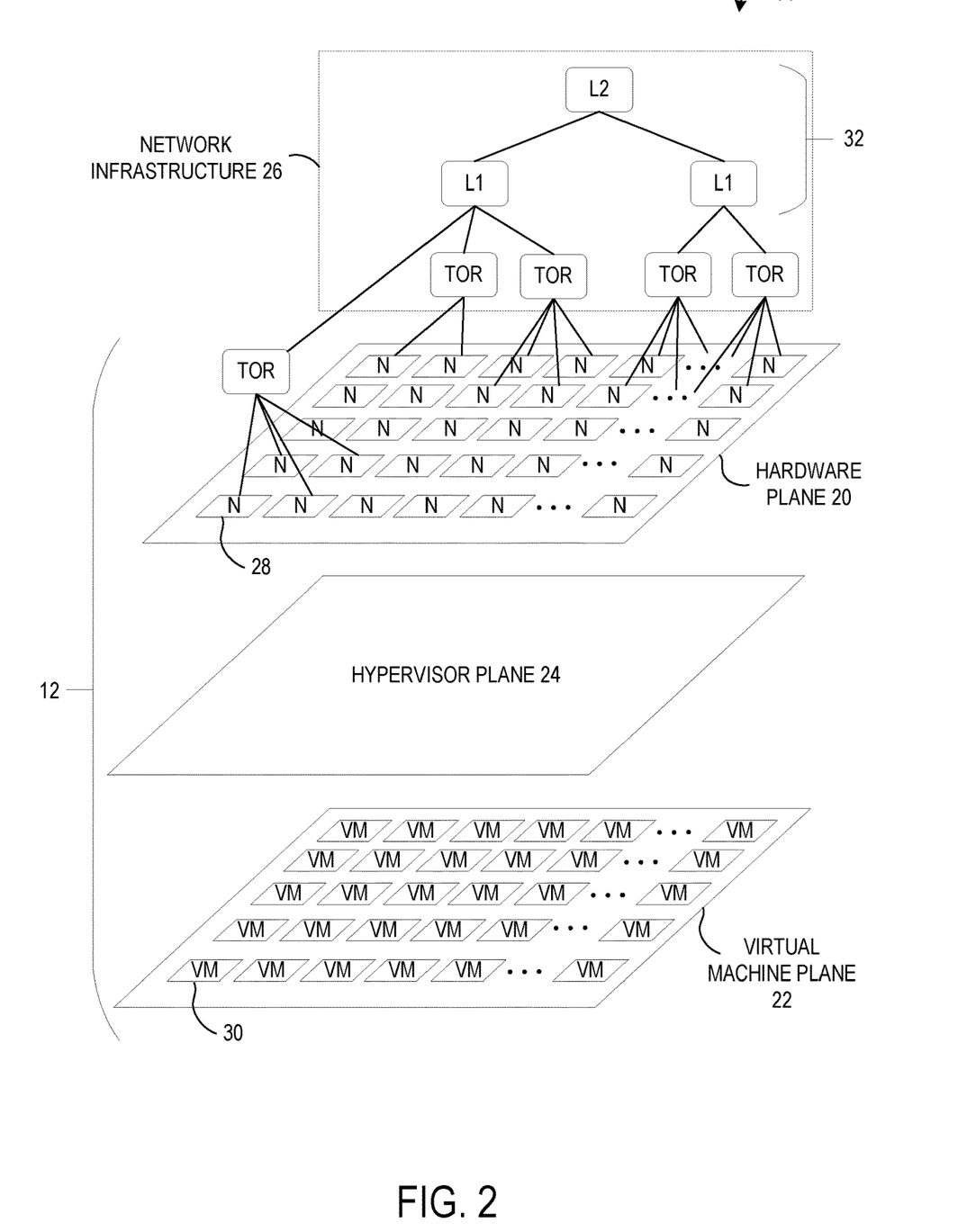
FIG. 2 is a schematic view of an example server system of the computer system of FIG. 1.

FIG. 2 illustrates an example of the server system 14. The server system 14 may include hardware plane 20, a virtual machine plane 22, a hypervisor plane 24, and network infrastructure 26 that are collectively configured to operate a cloud platform. The hardware plane 20 includes a collection of nodes 28 (each denoted by the symbol "N" in FIG. 2) that may include processors, graphics processing units (GPU), volatile memory, and other computer components configured to run host server instances. The host server instances executed by the nodes 28 of the hardware plane 20 are configured to communicate with one or more hypervisors of the hypervisor plane 24. The one or more hypervisors of the hypervisor plane 24 may create, handle, and monitor a plurality of virtual machines 30 (each denoted by the symbol "VM" in FIG. 2) of the virtual machine plane 22. Through the hypervisor plane 24, each virtual machine 30 of the virtual machine plane 22 may be hosted and run by the hardware components of one or more nodes 28 of the hardware plane 20. In this manner, the plurality of virtual machines 30 of the virtual machine plane 22 may share virtualized hardware resources managed by the hypervisor plane 24. Each virtual machine 30 provides a virtualized desktop environment within which software, such as a web browser application, a media player application, and other types of software may be executed.

In one example, the computer system 14 corresponds to a data center environment that communicatively couples the plurality of nodes 28 via standard network infrastructure. For example, the network infrastructure 20 may include typical network infrastructure, such as server racks including top-of-rack (TOR) network switches. The computer system 14 may include a plurality of node clusters that each have an associated TOR network switch. Network infrastructure 20 may further include higher-level switching infrastructure 32 (L1) and (L2) that connects the TOR network switches together. The higher-level switching infrastructure 32 may take the form of any suitable networking architecture, and may be driven by any suitable routing protocol(s). In the illustrated example, the higher-level infrastructure 32 includes a collection of aggregation switches L1 and core switches L2. However, it will be appreciated that the higher-level switching infrastructure may include any suitable number of levels of switches.

The virtual machines 30 of the virtual machine plane 22 provide a virtual computing environment within which users of the server system 14 may access and run applications, such as, for example, web browser, media player application, etc. As will be discussed in more detail below, these virtual machines 30 of the virtual machine plane 22 may be configured to implement multi-media redirection to reduce a compute workload placed on nodes of the hardware plane 20 caused by decoding and encoding processes typically performed for streaming media.

Additionally, it should be appreciated that the server system 14 is not limited to the datacenter/cloud platform example shown in FIG. 2. In other examples, the server system 14 may take the form of one or more computer devices configured to run a virtualized desktop environment. Using client computer devices 12, an associated user may connect to virtualized desktop environments run by the one or more computer devices to access software run within the virtualized desktop environment, which may be configured to implement the multi-media redirection functions and processes described herein.

Figure 3:
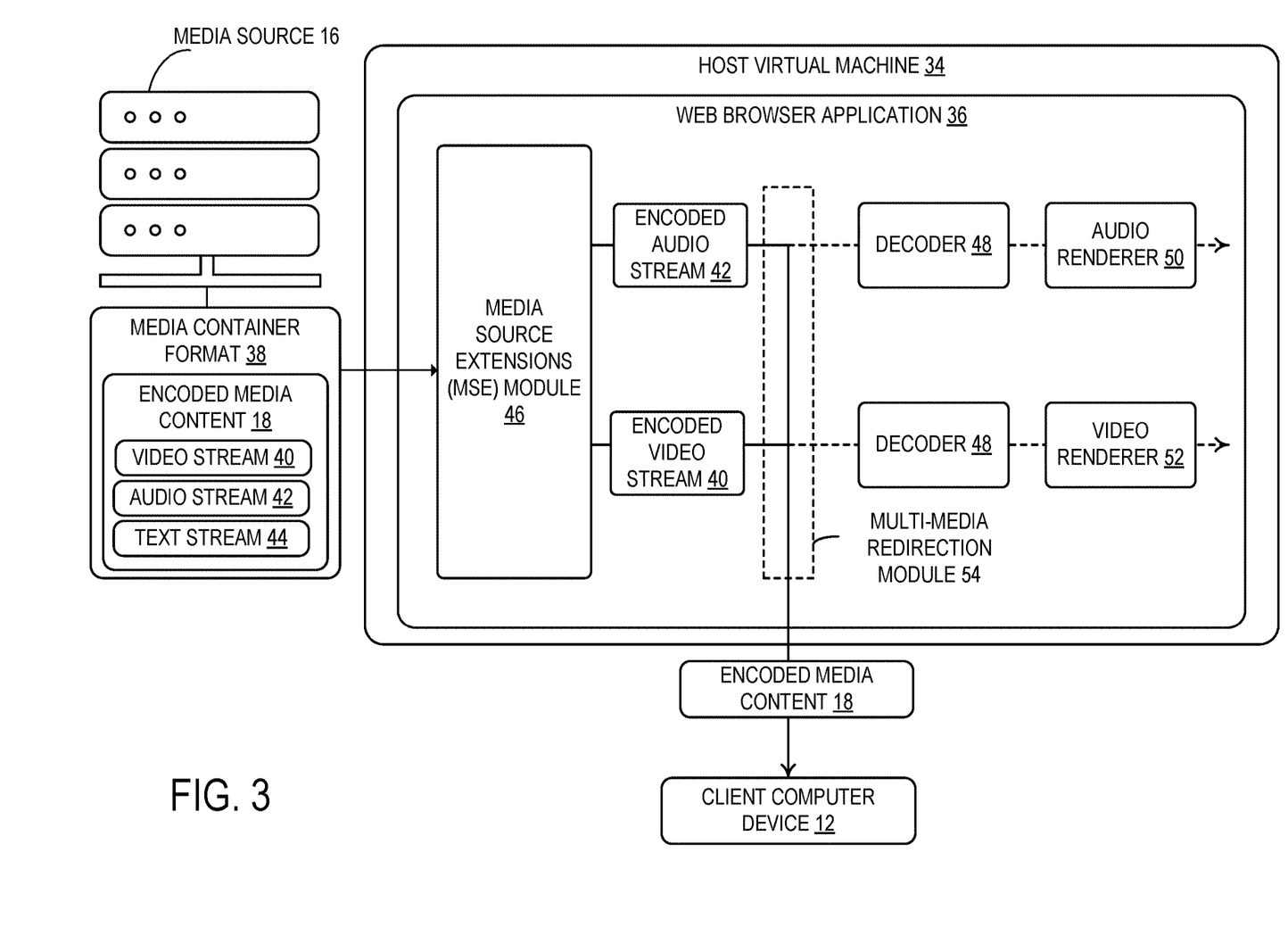
FIG. 3 is a schematic view of a web browser application implementing a multi-media redirection module to shim a rendering pipeline of the web browser application for the computer system of FIG. 1.

FIG. 3 illustrates an example host virtual machine 34 configured to perform multi-media redirection techniques to address the issues discussed above. The host virtual machine 34 may take the form of one of the virtual machines 30 of the virtual machine plane 22 of the cloud platform described with reference to FIG. 2. However, it should be appreciated that the host virtual machine 34 may also be implemented in non-cloud platform forms of server system 14.

The host virtual machine 34 may be executed by at least one processor of the server system 14. The host virtual machine 34 may be configured to host a session with at least one client computer device 12, and may host applications run within an operating system of the host virtual machine 34. In one example, the host virtual machine 34 may include a web browser application 36 executed by the at least one processor of the server system 14. As illustrated, the web browser application 36 may be configured to access media content from a media source 16. Using a graphical user interface (GUI) of the web browser application 36, the user may navigate to a target media source 16, such as, for example, a web page and associated server that serves media content. In one example, the media source 16 may be local to the server system 14 running the host virtual machine 34. In another example, the media source 16 may be remote to the server system 14, and may be configured to send encoded media content 18 to the server system 14 over a WAN.

The host virtual machine 34 may be configured to receive encoded media content 18 from the media source 16, which may take the form of a remote media source in the illustrated example. The encoded media content 18 may be encoded using any suitable algorithm. In one example, the encoded media content 18 is received in a media container format 38 that includes one or more of a video stream 40, audio stream 42, and a text stream 44. As a specific example, the media container format 38 may be an MP4 format, WAV format, AVI format, or another type of media container format 38.

The encoded media content 18 received by the host VM 34 may be processed by a media source extensions (MSE) module 46 of the web browser application 36 run on the host VM 34. The MSE module 46 may be configured to provide functionality for web-based media streaming. The MSE module 46 may be further configured to demux the encoded media content 18 in the media container format 38 into independent video, audio, and text streams. Typically, as illustrated in FIG. 3, the independent encoded audio stream 42 and encoded video stream 40 would be processed by audio and video rendering pipelines of the web browser application 36. For example, the encoded audio stream 42 and encoded video stream 40 may be respectively processed by decoders 48 that decompress the audio and video streams. The decompressed audio and video streams may then be respectively passed to an audio renderer 50 and a video renderer 52 to prepare the video and audio content for presentation. As discussed above, these decoding and rendering processes performed on the host VM 34 will consume hardware resources of the server device running the host VM 34, which may potentially degrade the user experience of other users hosted in a multi-session operating system of the host virtual machine 34.

Figure 4:
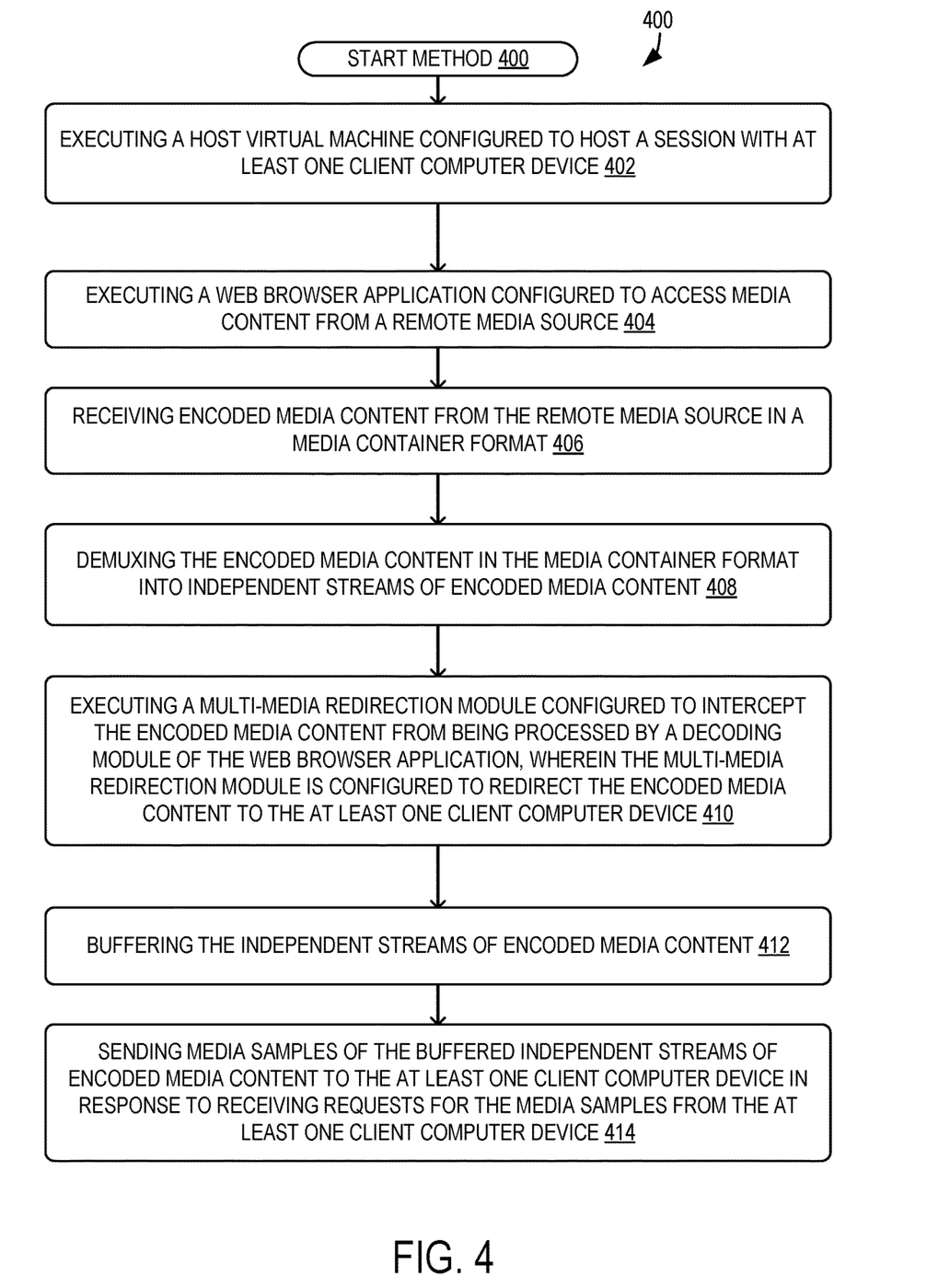
FIG. 4 is a flowchart of a method for performing multi-media redirection implemented by the computer system of FIG. 1.

To address these issues, the host virtual machine 34 may be configured to implement a multi-media redirection module 54 configured to redirect the encoded media content 18, including the encoded audio stream 42 and encoded video stream 40 to the client computer device 12. FIG. 4 is a flowchart of a method 400 implemented by the server system 14 running the host virtual machine 34 to perform multi-media redirection. Method 400 may be executed using the system described above or utilizing other suitable hardware and software elements.

At 402, the method 400 may include executing a host virtual machine configured to host a session with at least one client computer device. The host virtual machine 34 may be executed by at least one processor of a server system 14, which may, for example, take the form of the cloud platform data center illustrated in FIG. 2. In one example, the host virtual machine 34 may implement a multi-session operating system configured to concurrently host a plurality of sessions for a plurality of client computer devices 12. The plurality of sessions may be hosted within the same multi-session operating system instance. Each session may implement the techniques and processes for multi-media redirection described herein.

At 404, the method 400 may include executing a web browser application configured to access media content from a remote media source. The web browser application 36 may be run within the host virtual machine 34. In a multi-session operating system example, each of the plurality of sessions may have an associated web browser application 36 instance run in the multi-session operating system. The remote media source 16 may take the form of a 3rd party media service that streams media content such as video and/or audio. The web browser application 36 may be configured to access the remote media source 16 based on user web navigation input, such as, for example, a URL address for the remote media source 16.

At 406, the method 400 may include receiving encoded media content from the remote media source in a media container format. The encoded media content 18 may be received by the host virtual machine 34 over a WAN. As illustrated in FIG. 3, the encoded media content 18 may include one or more of an encoded video stream 40, an encoded audio stream 52, and an encoded text stream 44. The encoded streams of media content may be bundled in a media container format 38, such as, for example, an MP4 format, WAV format, etc.

At 408, the method 400 may include demuxing the encoded media content in the media container format into independent streams of encoded media content. For example, the web browser application 36 may be configured to implement an MSE module 46 that includes processes for unpacking the media container format 38 and demuxing the encoded media content 18 into independent streams, such as, for example, an encoded video stream 40, and encoded audio stream 42, and/or an encoded text stream 44.

At 410, the method 400 may include executing a multi-media redirection module configured to intercept the encoded media content from being processed by a decoding module of the web browser application. The multi-media redirection module 54 may take the form of a shim that intercepts application programming interface (API) calls and changes the arguments passed and the system behaviors applied to those arguments. For example, the multi-media redirection module 54 may intercept API calls that would pass the encoded audio/video/text streams to respective decoders and renderers, and redirect that encoded content to the associated client computer device 12 for that session. In this manner, the encoded media content 18 is not decoded by decoders 48 on the host virtual machine 34.

The encoded media content 18 being redirected to the client computer device 12 may be buffered and streamed to the client computer device 12 over a WAN. At 412, the method 400 may include buffering the independent streams of encoded media content. The independent streams of encoded media content, such as the encoded audio stream 42 and encoded video stream 40 may be temporarily stored in buffers on the host virtual machine 34.

At 414, the method 400 may include sending media samples of the buffered independent streams of encoded media content to the at least one client computer device in response to receiving requests for the media samples from the at least one client computer device. The client computer device 12 may request new media samples independently for each stream of encoded media content 18. For example, the client computer device 12 may request media samples for the encoded video stream 40 independently from requesting media sample for the encoded audio stream 40. In this manner, the client computer device 12 may request media samples for each independent stream of encoded media content (e.g. encoded audio stream, encoded video stream, etc.) at independent rates, and the host virtual machine 34 may send those media samples for each independent stream of encoded media content at the requested rates. Typically, video content will be larger in size than audio content, and thus may require a higher rate of video samples being sent to the client computer device 12.

Figure 5:
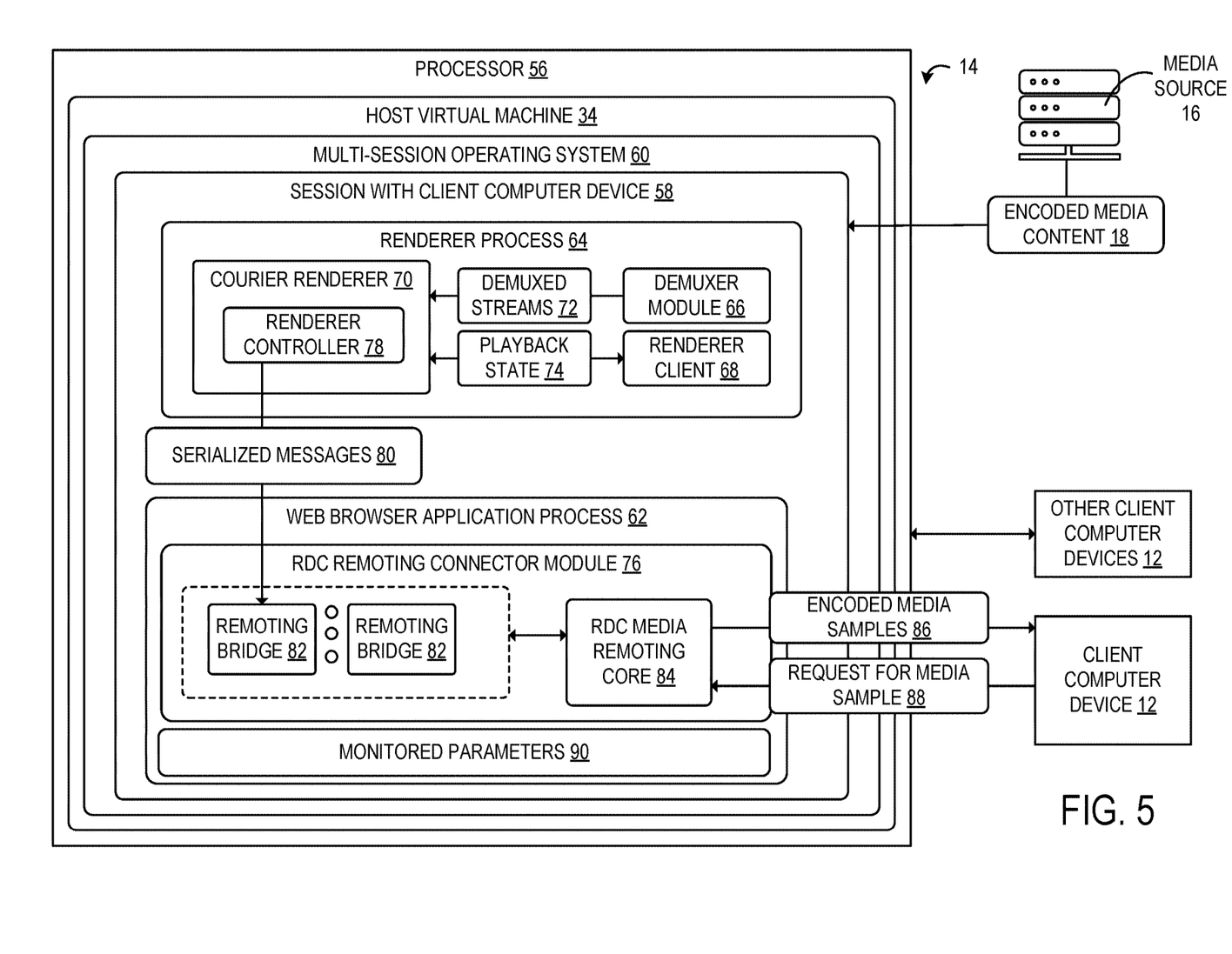
FIG. 5 is a schematic view of a software architecture for the web browser application that implements multi-media redirection for the computer system of FIG. 1.

FIG. 5 illustrates an example server-side software architecture for implementing the multi-media redirection module 54 and the steps described in method 400. In the illustrated example, at least one processor 56 of a server device included in the server system 14 may be configured to execute a host virtual machine 34 configured to host a session 58 with at least one client computer device 12. In the illustrated example, the host virtual machine 34 implements a multi-session operating system 60 configured to concurrently host a plurality of sessions 58 for a plurality of client computer devices 12. Each session 58 may be associated with a different client computer device 12, and may run separate instances of application programs on the host virtual machine 34. For example, each session 58 may execute separate instances of a web browser application 36 configured to access media content from the remote media source 16.

Each session 58 run within the multi-session operating system 60 may be further configured to receive encoded media content 18 from the remote media source 16 in a media container format 38, as described above with reference to FIGS. 3 and 4. In one example, the encoded media content 18 may take the form of dynamic streamed media content. In another example, the encoded media content 18 may take the form of HTTP Progressive Streaming content. However, it should be appreciated that the encoded media content 18 may take other suitable forms. Additionally, the encoded media content 18 may be received in a media container format that includes one or more of a video stream, audio stream, and a text stream. The video stream, audio stream, and text stream may be muxed in the media container format. It should be appreciated that the media container format may take the form of an MP4 format, WAV format, or any other suitable type of media container format.

Execution of the web browser application 36 may spin up a plurality of associated processes run within the multi-session operating system 60. As a specific example, a web browser application process 62 for the session 58 with the client computer device 58 may be run. Additionally, separate renderer processes 64 may be run for each tab opened in the web browser application 36. These separate renderer processes 64 may be sandboxed and run with a lower integrity level compared to the web browser application process 62.

Each renderer process 64 may include a demuxer module 66, renderer client 68, and a courier renderer 70. The demuxer module 66 may be configured to demux the encoded media content 18 in the media container format 38 into independent streams of encoded media content 72. The demuxed independent streams of encoded media content 72 may, for example, include an encoded video stream, and encoded audio stream, and/or an encoded text stream.

The courier renderer 70 forms a portion of the MMR module 54, and may be configured to request and receive compressed media samples from the demuxed independent streams of encoded media content 72. In one example, the courier renderer 70 may also be configured to notify the renderer client 68 of playback state 74 changes and playback time for the encoded media content 18.

In one example, the courier renderer 70 is run within the renderer process 64 if multi-media redirection (MMR) is enabled. If MMR is not currently enabled for the received encoded media content 18, then the renderer process 64 may be configured to run a media renderer in place of the courier renderer 70 that may be configured to handle decoding and rendering of the encoded media content via decoders 48, audio renderers 50, and video renderers 52. When MMR is enabled, the courier renderer 70 is loaded in place of a typical media renderer, and is configured to intercept the demux streams of media content and perform the functions and processes described herein. In this manner, the demuxed streams of media content are not decoded and rendered on the host virtual machine 34.

The MMR module 54 may further comprise a remote desktop connection (RDC) connector module 76. The courier renderer 70 may be further configured to cross-process communicate with the RDC remoting connector module 76. In one example, the RDC remoting connector module 76 may be run within the process of the web browser application process 62. In another example, the RDC remoting connector module 76 may be executed within another process separate from the web browser application process 62. As illustrated in FIG. 5, the courier renderer 70 may include a renderer controller 78 that is configured to handle communication with the RDC remoting connector module 76 via sending and receiving serialized messages 80. As a specific example, the serialized messages 80 may include commands that are serialized using a protocol such as, for example, an extended GOOGLE® PROTOCOL BUFFERS which is a language and platform neutral mechanism for serializing and deserializing structured data. However, it should be appreciated that other serialization protocols may also be implemented.

The courier renderer 70 may be configured to send demuxed media samples for the demuxed independent streams of encoded media content 72 to the RDC remoting connector module 76. The courier renderer 70 may also be configured to convert renderer commands into serialized messages 80 that are also sent to the RDC remoting connector module 76. Further, the courier renderer 70 may be configured to convert serialized messages 80 received from the RDC remoting connector module 76 to callbacks on the renderer client 68.

As discussed above, each tab opened in an instance of the web browser application may have an associated renderer process 64. The instances of the courier renderer 70 for each of these instances of the renderer process 64 may communicate with a single RDC remoting connector module 76 for that instance of the web browser application being executed with the session 58 with the client computer device 12. The RDC remoting connector module 76 may include a remoting bridge 82 for each courier renderer 70 that is configured to exchanged serialized messages with the associated courier renderer 70. In one example, the RDC remoting connector module 76 may be configured to act as a multiplexer that allows multiple courier rendered to be concurrently remoting to the client computer device 12.

As illustrated in FIG. 5, the RDC remoting connector module 76 may further include an RDC media remoting core 84 that includes logic for performing the functions and processes of the RDC remoting connector module 76. The RDC media remoting core 84 may also be configured to handle transmission of the demuxed independent streams of encoded media data 72 received at the remoting bridges 82 to a dynamic virtual channel (DVC) plugin implemented on the client computer device 12. The RDC remoting connector module 76 may also handle communication of serialized messages 80 with the DVC plugin on the client computer device 12.

As discussed above, the MMR module 54 may include the RDC remoting connector module 76 and the courier renderer 70. Using the processes described above, the MMR module 54 may be configured to intercept the encoded media content 18 from being processed by a decoding module 48 of the web browser application 38. For example, when MMR is enabled, the courier renderer 70 may be executed in place of a typical media renderer within the renderer process 64. That is, the MMR module 54 may cause the media samples from the demuxed independent streams of encoded media content (e.g. video/audio/text streams) to be sent to the courier renderer 70, which is configured to send those media samples to associated remoting bridges 82 of the RDC remoting connector module 76. Using the functions described for the RDC remoting connector module 76, the MMR module 54 may send those media samples to the client computer device 12 over a WAN. In this manner, the encoded media content is redirected to the at least one client computer device 12 by the MMR module 54, such that the encoded media content is not decoded or rendered on the host virtual machine 34.

Additionally, the MMR module 54 may be configured to buffer the independent streams of encoded media content 72, and send media samples of the buffered independent streams of encoded media content 72 to the at least one client computer device 12 in response to receiving requests for the media samples from the at least one client computer device 12. For example, the client computer device 12 may send a serialized message 80 to the RDC remoting connector module 76 that includes a request 88 for media samples for at least one of the streams of encoded media content. The RDC remoting connector module 76 may request the courier renderer 70 to send the requested media samples to the associated remoting bridge 82. The RDC remoting connector module 76 may then send the requested encoded media samples 86 to the client computer device 12 over a dynamic virtual channel. In one example, the client computer device 12 may send separate requests 88 for each independent stream of encoded media content 72. For example, the client computer device 12 may request media samples for the encoded video content steam at a higher rate than media samples for the encoded audio content. Thus, the MMR module 54 may be configured to send media samples 86 for each of the independent streams of encoded media content 72 at independent rates based on requests 88 for the media samples received from the at least one client computer device 12.

As discussed above, the MMR module 54, which may include the RDC remoting connector module 76 and the courier renderer 70, is loaded and executed when MMR is enabled for the encoded media content 18. In one example, the at least one processor 56 may be configured to determine whether to enable MMR, and whether to execute the MMR module 54 to intercept or to allow the encoded media content 18 to be processed by the decoding module 48 of the web browser application 36 based on one or more monitored parameters 90. In one example, the host virtual machine 34 may be configured to monitor a network parameter between the server system 14 and the at least one client computer device 12, and determine whether to enable MMR based on the monitored network parameter.

As another example, the host virtual machine 34 may be configured to monitor a current processing load of the at least one processor 56 running the host virtual machine 34, and determines whether to enable MMR based on the current processing load. As a specific example, if the current processing load on the at least one processor 56 is over a threshold level, the host virtual machine 34 may be configured to enable MMR and load the MMR module 54 and its associated media stack to intercept the encoded media content 18 from being processed by a standard rendering process that performs decoding and rendering. On the other hand, if the current processing load is below the threshold level and the monitored network parameter indicates that the network bandwidth is low, the host virtual machine may be configured to disable MMR and decode/render the encoded media content. The rendered frames may then be encoded with a compression level suitable for the network bandwidth between the server system and the client computer device.

As another example, the host virtual machine 34 may be configured to determine whether to enable MMR and load the MMR module 54 based on a user setting of the at least one client computer device 12. For example, an administrator may control a user setting to enable or disable MMR for the client computer device. The user setting may be sent to the host virtual machine 34 and stored for that client computer device. In one specific example, MMR may be independently enabled or disabled via user settings for different media sources 16.

As discussed above, the host virtual machine 34 may implement a multi-session operating system 60 that hosts sessions 58 with a plurality of client computer devices 12. Activity with each client computer device 12 may increase a processing workload placed on the at least one processor 56 running the host virtual machine 34. Thus, in one example, the host virtual machine 34 may be configured to determine an aggregate activity of the plurality of sessions 58 hosted by the multi-session operating system 60, and determine whether to execute the MMR module 54 based on an aggregate activity. As a specific example, if the aggregate activity of the plurality of sessions 58 is low because only one session is currently accessing encoding media content for streaming, then the host virtual machine 34 may be configured to not enable MMR and to allow decoding and rendering processes to be performed on host virtual machine 34. On the other hand, if the aggregate activity of the plurality of sessions 58 is high due to multiple sessions attempting to access ended media content, then the host virtual machine 34 may be configured to enable MMR and load the MMR module 54.

The host virtual machine 34 may be configured to enable or disable MMR dynamically based on changes to the monitored parameters 90. Additionally, it should be appreciated that the example monitored parameters discussed above are merely exemplary, and that the host virtual machine 34 may dynamically determine whether to enable MMR based on other parameters, such as a size of the encoded media content, a source of the encoded media content, etc.

Figure 6:
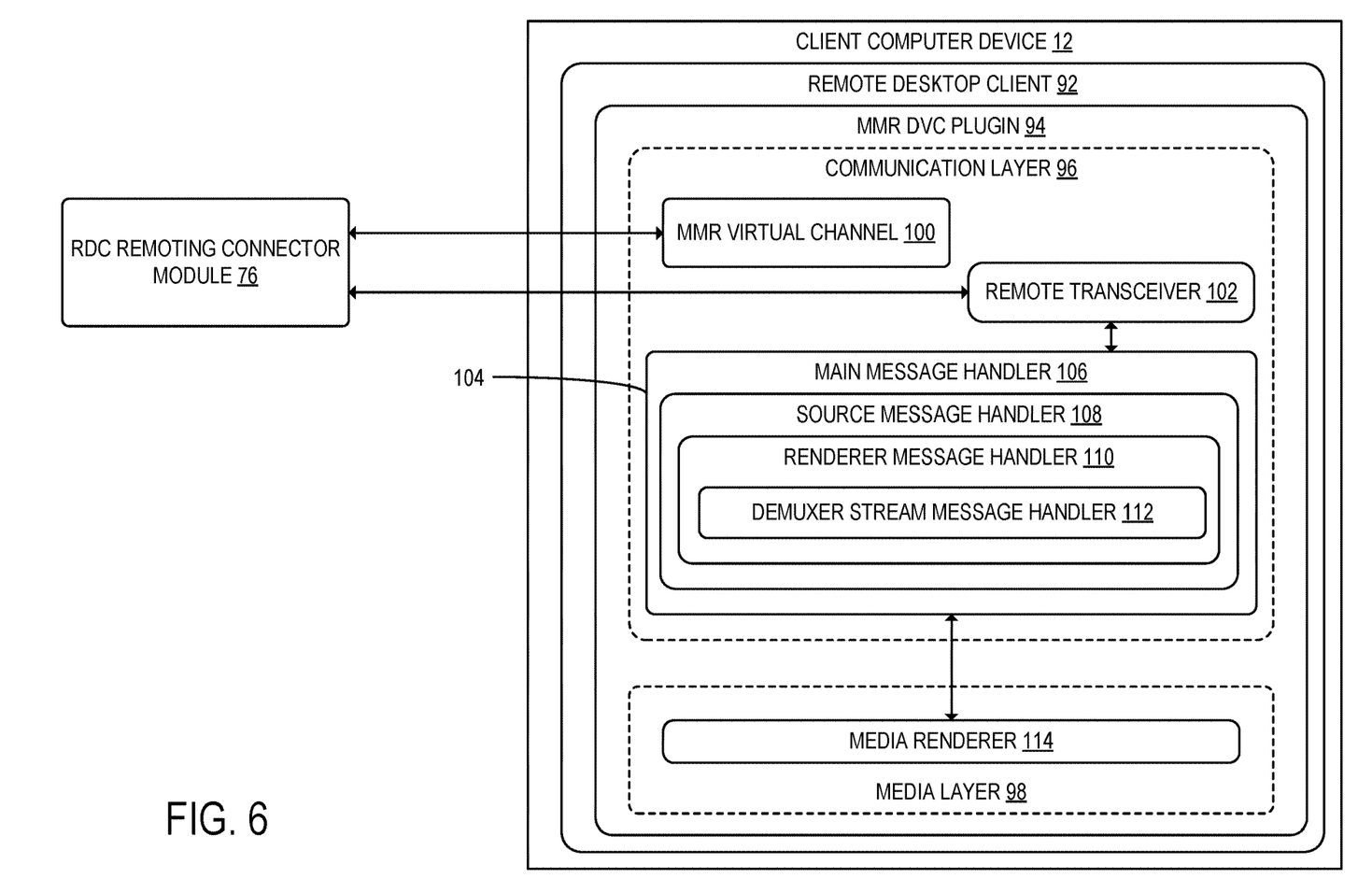
FIG. 6 is a schematic view of a software architecture for a remote desktop client that communicates with a multi-media redirection module implemented by the computer system of FIG. 1.

FIG. 6 illustrates an example remote desktop client 92 that may be executed by processors of each client computer device 12 to communicate with the host virtual machine 34. The remote desktop client 92 includes an MMR DVC plugin 94 that is configured to interact with the MMR module 54 executed by the host virtual machine 34. When MMR is enabled by the host virtual machine 34, the MMR DVC plugin 94 may be loaded on the remote desktop client 92. On the other hand, if MMR is not enabled, the remote desktop client 92 may be configured to use typical remoting techniques and processes.

The MMR DVC plugin 94 includes a communication layer 96 and a media layer 98. The communication layer 96 is configured to handle communication between the MMR DVC plugin 94 and the RDC remoting connector module 76 of the host virtual machine 34. The communication layer 96 may include an MMR virtual channel 100 configured to open a channel with the RDC remoting connector module 76 of the host virtual machine 34. An instance of the MMR virtual channel 100 may be created for each instance of the web browser application 36 that is opened for the session. A remote transceiver 102 created when a new connection from the host virtual machine 34 is accepted, such as, for example, when an instance of the web browser application 36 on the host virtual machine 34 is opened and media content is accessed.

The remote transceiver 102 may be configured to send and receive messages 104 to/from the RDC remoting connector module 76 of the host virtual machine 34. As illustrated, the messages 104 are structured to include a main message handle 106, a source message handle 108, a renderer message handler 110, and a demuxer stream message handler 112. The main message handler 106 may be configured to included data for negotiating versioning information between the client and host.

The messages 104 may include a source message handler 108 for each remoting bridge 82 of the RDC remoting connector module 76. Each source message handler 108 further includes a respective renderer message handler 110 for handling messages with the renderer process 64. The renderer message handler 110 may include data regarding a playback state for the encoded media content being processed by the associated renderer process 64. For example, the renderer message handler 110 may communicate whether the media content should be paused, seeked to a target position, etc. The renderer message handler 110 may also be used to report a status of playback to the host virtual machine 34, such as a playback position, whether playback has ended, or errors in playback.

Each renderer message handler 110 further includes a demuxer stream message handler 112 configured to include data for handling demux based operations, such as, for example, requesting a media sample for each demuxed independent stream of encoded media 72. That is, the client computer device 12 may request new media samples for specific streams of encoded media content via the demuxer stream message handler 112. As discussed above, the client computer device 12 may request media content at independent rates for each demuxed stream of media content. For example, the client computer device 12 may request media samples for video media content at a higher rate than media samples for audio media content.

The media layer 98 includes a media renderer 114 may send and receive messages 104 via the remote transceiver 102 of the communication layer 96. Using the messages 104, the media renderer 114 may request media samples for the streams of encoded media content 72, such as, for example, media samples for encoded video content, media sample for encoded audio content, and media samples for encoded text content. The media renderer 114 may then decode the received media samples, and render the decoded media samples for presentation to a user via output devices of the client computer device 12, such as a display, speakers, etc. It should be appreciated that the media renderer 114 may use any suitable rendering techniques for the platform of the client computer device 12.

In the manner discussed above, encoded media content may be redirected to the client computer device 12 such that the media content is not decoded or rendered on the host virtual machine 34. Rather, the encoded media content is streamed to the client computer device 12, which is configured to decode and render the media content for display. Thus, by performing MMR and avoiding decoding/rendering processes on the host virtual machine, the processing workload on the hardware running the host virtual machine may be reduced.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
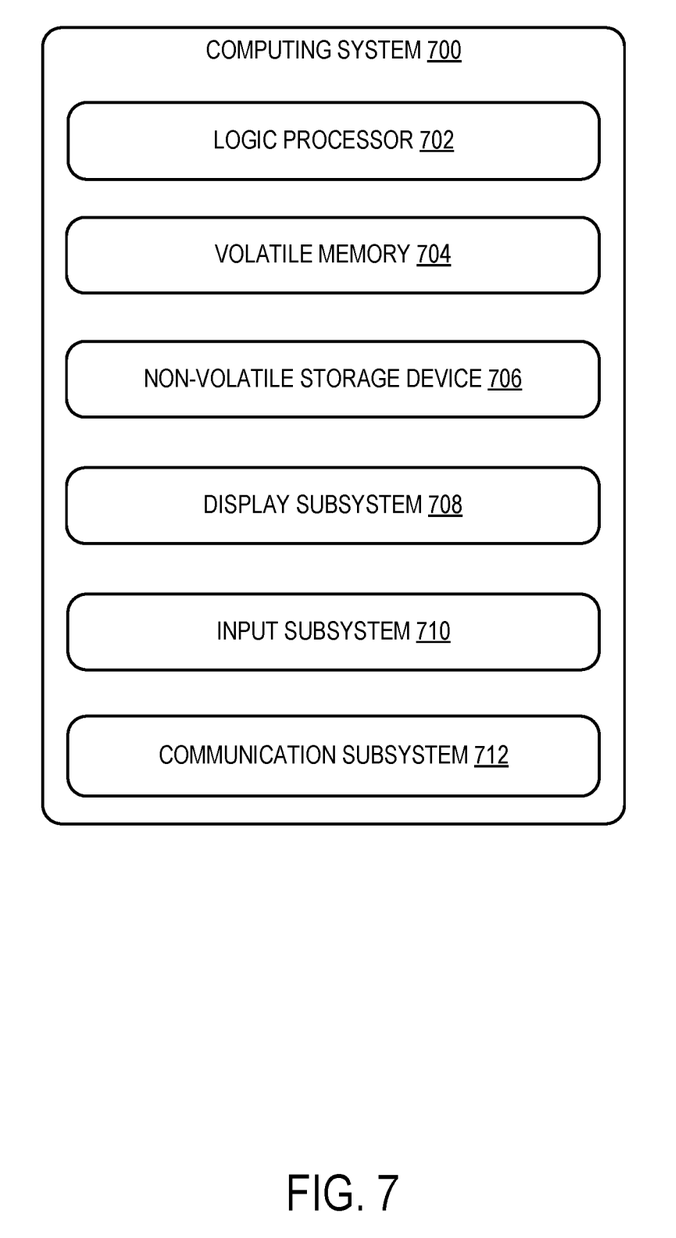
FIG. 7 is a schematic view of an example computing environment in which the computer system of FIG. 1 may be enacted.

FIG. 7 schematically shows a non-limiting embodiment of a computing system 700 that can enact one or more of the methods and processes described above. Computing system 700 is shown in simplified form. Computing system 700 may embody the client computer device 12 and the server devices of the server system 14 described above and illustrated in FIGS. 1 and 2. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702 volatile memory 704, and a non-volatile storage device 706. Computing system 700 may optionally include a display subsystem 708, input subsystem 710, communication subsystem 712, and/or other components not shown in FIG. 7.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built in. Non-volatile storage device 706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

The following paragraphs provide additional support for the claims of the subject application. One aspect provides a computer system comprising at least one processor configured to execute a host virtual machine configured to host a session with at least one client computer device. The at least one processor is further configured to execute a web browser application configured to access media content from a remote media source, receive encoded media content from the remote media source in a media container format, and execute a multi-media redirection module configured to intercept the encoded media content from being processed by a decoding module of the web browser application. The multi-media redirection module is configured to redirect the encoded media content to the at least one client computer device. In this aspect, additionally or alternatively, the encoded media content may be dynamic streamed media content. In this aspect, additionally or alternatively, the encoded media content may be received in the media container format that includes one or more of a video stream, audio stream, and a text stream, and the at least one processor may be configured to demux the encoded media content in the media container format into independent streams of encoded media content. In this aspect, additionally or alternatively, the independent streams of encoded media content may include one or more of the video stream, audio stream, and the text stream. In this aspect, additionally or alternatively, the multi-media redirection module may be configured to buffer the independent streams of encoded media content, and send media samples of the buffered independent streams of encoded media content to the at least one client computer device in response to receiving requests for the media samples from the at least one client computer device. In this aspect, additionally or alternatively, the multi-media redirection module may be configured to send media samples for each of the independent streams of encoded media content at independent rates based on requests for the media samples received from the at least one client computer device. In this aspect, additionally or alternatively, the at least one processor may be configured to determine whether to execute the multi-media redirection module to intercept the encoded media content or to allow the encoded media content to be processed by the decoding module of the web browser application based on one or more monitored parameters. In this aspect, additionally or alternatively, the one or more monitored parameters may be selected from the group consisting of a network parameter between the computer system and the at least one client computer device, a current processing load of the at least one processor of the computer system, a size of the encoded media content, and a user setting of the at least one client computer device. In this aspect, additionally or alternatively, the host virtual machine executed by the at least one processor may include a multi-session operating system configured to concurrently host a plurality of sessions for a plurality of client computer devices. In this aspect, additionally or alternatively, the at least one processor may be configured to determine whether to execute the multi-media redirection module based on an aggregate activity of the plurality of sessions hosted by the multi-session operating system.

Another aspect provides a method comprising, at a processor of a server device, executing a host virtual machine configured to host a session with at least one client computer device, executing a web browser application configured to access media content from a remote media source, receiving encoded media content from the remote media source in a media container format, and executing a multi-media redirection module configured to intercept the encoded media content from being processed by a decoding module of the web browser application. The multi-media redirection module is configured to redirect the encoded media content to the at least one client computer device. In this aspect, additionally or alternatively, the encoded media content may be dynamic streamed media content. In this aspect, additionally or alternatively, the encoded media content may be received in the media container format that includes one or more of a video stream, audio stream, and a text stream, and the method may further comprise demuxing the encoded media content in the media container format into independent streams of encoded media content. In this aspect, additionally or alternatively, the independent streams of encoded media content may include one or more of the video stream, audio stream, and the text stream. In this aspect, additionally or alternatively, the method may further comprise buffering the independent streams of encoded media content, and sending media samples of the buffered independent streams of encoded media content to the at least one client computer device in response to receiving requests for the media samples from the at least one client computer device. In this aspect, additionally or alternatively, the method may further comprise sending media samples for each of the independent streams of encoded media content at independent rates based on requests for the media samples received from the at least one client computer device. In this aspect, additionally or alternatively, the method may further comprise determining whether to execute the multi-media redirection module to intercept and the encoded media content or to allow the encoded media content to be processed by the decoding module of the web browser application based on one or more monitored parameters. In this aspect, additionally or alternatively, the one or more monitored parameters may be selected from the group consisting of a network parameter between the server device and the at least one client computer device, a current processing load of the at least one processor of the server device, a size of the encoded media content, and a user setting of the at least one client computer device. In this aspect, additionally or alternatively, the host virtual machine may include a multi-session operating system configured to concurrently host a plurality of sessions for a plurality of client computer devices.

Another aspect provides a server system comprising at least one processor configured to execute a host virtual machine that implements a multi-session operating system configured to concurrently host a plurality of sessions for a plurality of client computer devices. The at least one processor is further configured to execute an instance of a web browser application for one or more of the plurality of sessions. The web browser application is configured to receive encoded media content from remote media sources. The processor is further configured to determine that an aggregate activity of the plurality of sessions for the host virtual machine is above a threshold level, enable multi-media redirection for the one or more of the plurality of sessions based on the determined aggregate activity, and execute a multi-media redirection module configured to intercept the encoded media content from being processed by a decoding module of the web browser application. The multi-media redirection module is configured to redirect encoded media content to respective client computer devices of the one or more plurality of sessions.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer system comprising:
at least one processor configured to execute a host virtual machine configured to host a session with at least one client computer device, wherein the at least one processor is further configured to:
execute a web browser application configured to access encoded media content from a media source, wherein the encoded media content is formatted in a media container format that includes a video stream, an audio stream, a text stream, or a combination thereof;
demux, by the web browser application, the encoded media content formatted in the media container format into independent streams;
prevent the independent streams from being decoded by a decoder of the web browser application by intercepting the independent streams prior to the independent streams being provided to the decoder of the web browser application;
buffer, by the web browser application, parts of the independent streams; and
send, by the web browser application, media samples of the parts of the independent streams to the at least one client computer device.

2. The computer system of claim 1, wherein the encoded media content is dynamic streamed media content.

3. The computer system of claim 1, wherein the media samples of the parts of the independent streams are sent to the at least one client computer device in response to receiving requests for the media samples from the at least one client computer device.

4. The computer system of claim 3, wherein the media samples for each of the independent streams are sent at independent rates based on the requests for the media samples received from the at least one client computer device.

5. The computer system of claim 1, wherein the at least one processor is configured to determine whether to intercept the independent streams or to allow the independent streams to be decoded by the decoder of the web browser application based on one or more monitored parameters.

6. The computer system of claim 5, wherein the one or more monitored parameters are selected from a group comprising: a network parameter between the computer system and the at least one client computer device, a current processing load of the at least one processor of the computer system, a size of the encoded media content, or a user setting of the at least one client computer device.

7. The computer system of claim 5, wherein the host virtual machine executed by the at least one processor includes a multi-session operating system configured to concurrently host a plurality of sessions for a plurality of client computer devices.

8. The computer system of claim 7, wherein the one or more monitored parameters include an aggregate activity of the plurality of sessions hosted by the multi-session operating system.

9. A method comprising:
- executing, by a processor, a host virtual machine configured to host a session with at least one client computer device;
- executing, by the processor, a web browser application configured to access media content from a media source;
- receiving encoded media content from the media source in a media container format; and
- determining, by the processor, whether to redirect processing of the encoded media content from the web browser application to the at least one client computer device or to allow the encoded media content to be processed by the web browser application based on one or more monitored parameters.

10. The method of claim 9, wherein the encoded media content is dynamic streamed media content.

11. The method of claim 9, wherein the encoded media content is received in the media container format as a video stream, an audio stream, or a text stream, and wherein the method further comprises demuxing the encoded media content in the media container format into independent streams.

12. The method of claim 11, wherein redirecting the processing of the encoded media content from the web browser application to the at least one client computer device comprises:
- buffering parts of the independent streams; and
- sending media samples of the parts of the independent streams to the at least one client computer device.

13. The method of claim 12, wherein the media samples for each of the independent streams are sent at independent rates based on requests for the media samples received from the at least one client computer device.

14. The method of claim 9, wherein the one or more monitored parameters are selected from a group comprising a network parameter between a server device on which the processor is configured and the at least one client computer device, a current processing load of the processor, a size of the encoded media content, or a user setting of the at least one client computer device.

15. The method of claim 9, wherein the host virtual machine includes a multi-session operating system configured to concurrently host a plurality of sessions for a plurality of client computer devices.

16. The method of claim 15, wherein the one or more monitored parameters include an aggregate activity of the plurality of sessions hosted by the multi-session operating system.

17. A server system comprising:
- at least one processor configured to execute a host virtual machine that implements a multi-session operating system configured to concurrently host a plurality of sessions for a plurality of client computer devices, wherein the at least one processor is further configured to:
- execute a web browser application for a session of the plurality of sessions, the web browser application being configured to receive encoded media content from a media source for the session;
- determine that an aggregate activity of the plurality of sessions for the host virtual machine is above a threshold level;
- enable multi-media redirection for the session based on the aggregate activity by preventing the encoded media content from being processed by a decoder of the web browser application and redirecting the encoded media content to an associated client computer device of the plurality of client computer devices.

18. The server system of claim 17, wherein the encoded media content is formatted in a media container format that includes a video stream, an audio stream, or a text stream, and wherein the at least one processor is configured to demux the encoded media content in the media container format into independent streams prior to the multi-media redirection.

19. The server system of claim 18, wherein the at least one processor is further configured to:
- buffer parts of the independent streams; and
- send media samples of the parts of the independent to the associated client computer device.

20. The server system of claim 19, wherein the media samples for each of the independent streams are sent at independent rates based on requests for the media samples received from the associated client computer device.

* * * * *